US009722775B2

(12) United States Patent
Hjelm et al.

(10) Patent No.: US 9,722,775 B2
(45) Date of Patent: Aug. 1, 2017

(54) NETWORK SERVICES VIA TRUSTED EXECUTION ENVIRONMENT

(71) Applicant: Verizon Patent and Licensing Inc., Arlington, VA (US)

(72) Inventors: Bjorn Hjelm, Livermore, CA (US); Thomas W. Haynes, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/633,615

(22) Filed: Feb. 27, 2015

(65) Prior Publication Data
US 2016/0254904 A1    Sep. 1, 2016

(51) Int. Cl.
*H04L 29/06*    (2006.01)
*H04L 9/00*    (2006.01)
*H04L 9/32*    (2006.01)

(52) U.S. Cl.
CPC ............ *H04L 9/006* (2013.01); *H04L 9/3234* (2013.01); *H04L 9/3263* (2013.01); *H04L 9/3271* (2013.01)

(58) Field of Classification Search
CPC ................................. H04L 29/06; G06F 11/30
USPC .......................................... 713/150–153, 193
See application file for complete search history.

(56) References Cited

U.S. PATENT DOCUMENTS

| 881,257 | A | * | 3/1908 | Cha | A42C 3/00 |
| | | | | | 223/8 |
| 8,959,331 | B2 | * | 2/2015 | Chastain | H04L 63/0428 |
| | | | | | 713/150 |
| 9,124,573 | B2 | * | 9/2015 | Chastain | H04L 63/0807 |
| 9,240,994 | B2 | * | 1/2016 | Chastain | H04L 63/0869 |
| 9,386,045 | B2 | * | 7/2016 | Kgil | H04L 63/205 |
| 2006/0195689 | A1 | * | 8/2006 | Blecken | G06F 21/445 |
| | | | | | 713/156 |
| 2009/0217385 | A1 | * | 8/2009 | Teow | G06F 21/604 |
| | | | | | 726/27 |
| 2011/0010543 | A1 | * | 1/2011 | Schmidt | H04W 12/10 |
| | | | | | 713/168 |
| 2011/0302400 | A1 | * | 12/2011 | Maino | G06F 21/575 |
| | | | | | 713/2 |
| 2014/0317686 | A1 | * | 10/2014 | Vetillard | G06F 21/74 |
| | | | | | 726/2 |
| 2015/0229477 | A1 | * | 8/2015 | Blair | H04L 9/3213 |
| | | | | | 713/156 |
| 2015/0358301 | A1 | * | 12/2015 | Dalbehera | H04L 63/061 |
| | | | | | 713/171 |

* cited by examiner

*Primary Examiner* — Dede Zecher
*Assistant Examiner* — Dereena Cattungal

(57) ABSTRACT

A device includes one or more communication interfaces that communicate via at least one link or a network; a device memory; a device processing unit; and a Trusted Execution Environment (TEE) that is secure from the device processing unit and the device memory. The TEE obtains a public encryption key and a private encryption key pair, stores the private encryption key in a secure memory in the Trusted Execution Environment (TEE), and executes a first trusted application, within the TEE, to perform a PKI function using the private encryption key.

13 Claims, 13 Drawing Sheets

NETWORK SERVICES VIA TRUSTED EXECUTION ENVIRONMENT

BACKGROUND

Smart cards typically consist of pocket-sized, or smaller, cards with embedded integrated circuits. Memory cards and microprocessor cards are two categories of smart cards. Memory cards contain only non-volatile memory storage components. Microprocessor cards contain memory storage components and microprocessor components. Microprocessor smart cards are typically used with mobile devices, such as cellular telephones, and have both limited memory capacity and processing power relative to the memory and microprocessor contained in the mobile devices into which the smart cards are inserted.

Subscriber Identity Module (SIM), Universal Integrated Circuit Cards (UICCs), and Removable User Identify Module (R-UIM) cards are examples of microprocessor smart cards. SIM cards securely store an identifier or key used to identify a subscriber on mobile telephone devices (e.g., cellular radiotelephones). SIM cards enable users to change phones by removing the SIM card from one telephony device and inserting it into another telephony device. UICCs are smart cards used in mobile terminals in Global System for Mobile Communications (GSM) and Universal Mobile Telecommunications System (UMTS) networks. UICCs ensure the integrity and security of different types of personal data, and may include several applications that permit access to both GSM and UMTS networks. R-UIMs include cards having features that are usable with Code Division Multiple Access (CDMA), GSM and UMTS devices.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement a Trusted Execution Environment (TEE) within a mobile device for secure Public Key Infrastructure (PKI) processing, wherein the TEE is isolated and secure from the mobile device's normal "rich" operating system. A "trusted execution environment (TEE)" as referred to herein includes a TEE as specified by Trusted Computing Group™ standards and/or GlobalPlatform™ standards. The isolated and secure TEE stores private keys that are part of a public key/private key pair, and executes trusted applications that enable, using the stored private key, the performance of secure PKI functions such as, for example, authentication, encryption, signature generation, key management, data shredding and data zipping (i.e., compression). The TEE also executes a trusted application that enables, using a stored digital certificate for a network service, the mobile device to securely engage in the network service with a network service provider.

Figure 1A:
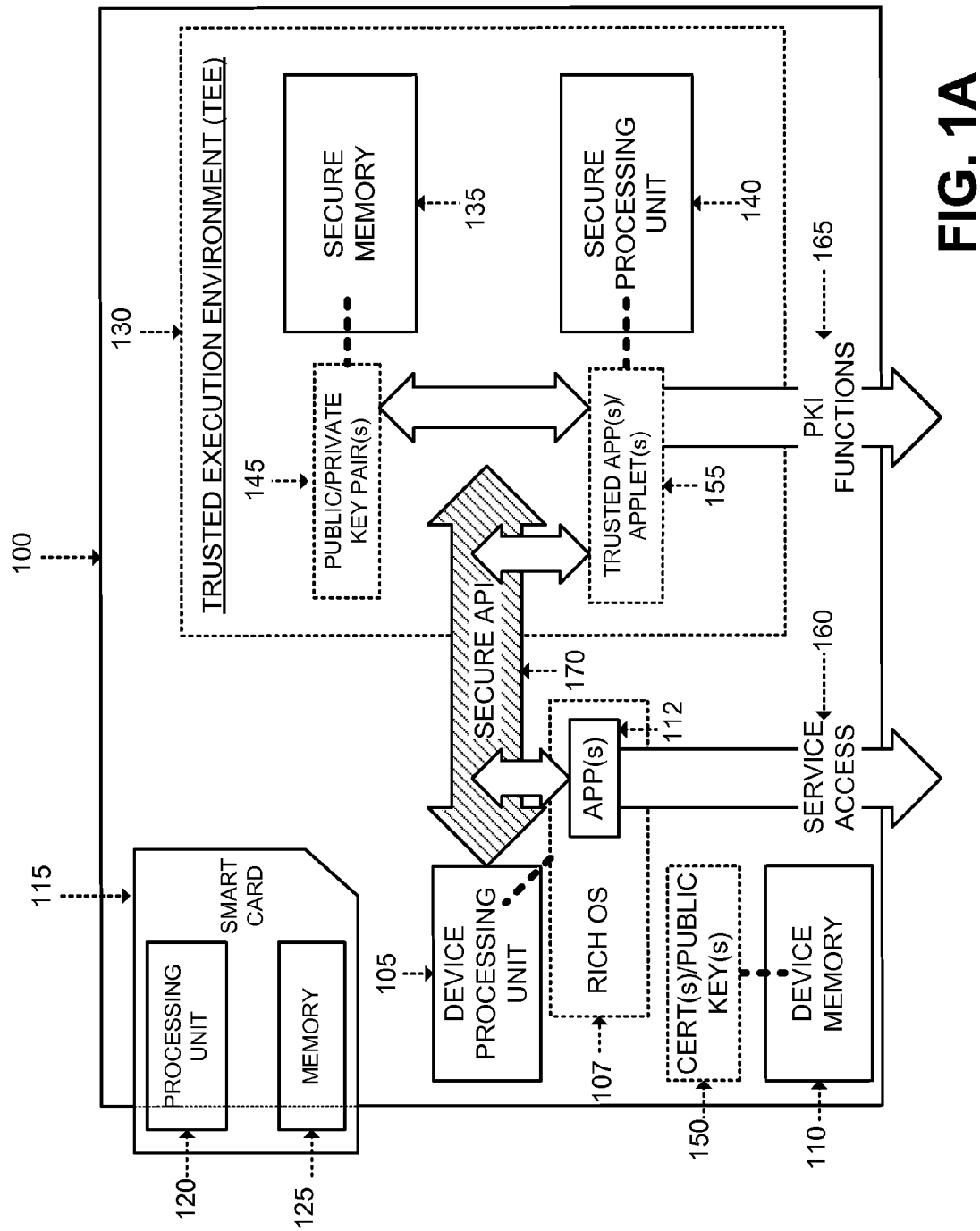
FIGS. 1A, 1B and 1C are diagrams that depict an exemplary device in which a secure and isolated data storage and processing environment may be implemented for the secure storage of data and for the secure execution of trusted applications.

FIG. 1A is a diagram that depicts an exemplary device 100 in which an isolated and secure data storage and processing environment may be implemented for the secure storage of data and the secure execution of trusted applications. Device 100 may include any type of electronic device that includes mechanisms for wired or wireless communication. Device 100 may include, for example, a cellular radiotelephone, a smart phone, a personal digital assistant (PDA), a laptop computer, a palmtop computer, a tablet computer, a wearable computer, a gaming device, a media player device, or a digital camera that includes communication capabilities (e.g., wireless communication mechanisms).

As shown in FIG. 1A, device 100 may include a device processing unit 105, a device memory 110, a smart card 115, and a TEE 130. Device processing unit 105 may include a processor, microprocessor, or processing logic that may interpret and execute instructions to perform various operations of device 100, including executing a "rich" operating system (Rich OS) 107, and one or more applications (apps) 112. Rich OS 107 may include, for example, Android, Windows Phone, or Symbian.

Device memory 110 may include one or more memory devices (i.e., each including a non-transitory computer-readable medium), such as a random access memory (RAM) or another type of dynamic storage device, that may store information for retrieval, and instructions for execution, by device processing unit 105. Device memory 110 may also include a Read Only Memory device, or another type of static storage device, that may store static information and instructions for use by device processing unit 105. Device memory 110 may further include a magnetic, optical and/or flash storage device (e.g., Universal Serial Bus (USB) flash drive).

Smart card 115 may include any type of smart card usable for inserting in device 100 and for storing information or data relevant to the operation of device 100. Smart card 115 may, for example, include a UICC, a R-UIM, a SIM, a universal subscriber identity module (USIM), an Internet Protocol (IP) multimedia services identity module (ISIM), or an embedded secure element (eSE). Smart card 115 may include a processing unit 120 and a memory 125, wherein processing unit 120 and memory 125 have limited capability and/or capacity. Processing unit 120, therefore, has a limited processing capability and memory 125 has a limited storage capacity relative to, for example, device processing unit 105 and device memory 110. Smart card 115 may additionally include input/output circuitry (not shown) for inputting data to smart card 115 from device 100, and for outputting data from smart card 115 to device 100.

Processing unit 120 of smart card 115 may include a processor, microprocessor, or processing logic that may interpret and execute instructions. Memory 125 of smart card 115 may include RAM, ROM, and/or Electrically Erasable Programmable Read-Only Memory (EEPROM) that may store data, and may store instructions for execution by processing unit 120. Smart card 115 may store data and/or perform certain operations or processes, such as, for example, storing a mobile subscriber identity associated with a user of device 100, storing security authentication and ciphering information, storing a list of services that the user has access to, and/or storing a personal identification number (PIN) for the user. Smart card 115 may store the data and/or perform the operations in response to processing unit 120 executing software instructions contained in a computer-readable medium, such as memory 125.

TEE 130 may, in an implementation depicted in FIG. 1A, include an isolated software or hardware-based environment that further includes memory and processing resources that are secure from device processing unit 105, device memory 110, and smart card 115 of device 100. In the implementation depicted in FIGS. 1A and 1B, TEE 130 provides software or hardware-based isolation from the "rich" operating system of device 100, such as, for example, from Android, Windows Phone, or Symbian. TEE 130 may include a secure memory 135 and a secure processing unit 140. Secure memory 135 and secure processing unit 140 may be hardware components isolated from, for example, device processing unit 105 such that device processing unit 105 has only limited and restricted access (e.g, via a secure Application Program Interface (API)), to functions executed by secure processing unit 140 or to data stored in secure memory 135. TEE 130 may, in some implementations, include software or firmware, instead of hardware, that provides the isolated environment that secures TEE 130 from device processing unit 105 and the "rich" operating system (rich OS 107) of device 100.

Secure memory 135 (i.e., a non-transitory computer-readable medium) may store a public/private key pair, where the private key of the public/private key pair cannot be accessed or retrieved by device processing unit 105. The public key of the public/private key pair may be stored in secure memory 135 and also made available to device processing unit 105 by storage in device memory 110. Additionally, secure memory 135 or device memory 110 may store one or more digital certificates and public keys 150. The digital certificates may include a Public Key Infrastructure (PKI) digital certificate (i.e., "public key certificate") obtained using PKI mechanisms. A "digital certificate" includes an electronic "pass" that allows device 100 to exchange information securely over network 230 (shown in FIG. 2) using PKI. Other types of digital certificates, such as those issued by network service providers to enable device 100 access to their network services, may be stored in device memory 110 or secure memory 135. Secure processing unit 140 may execute one or more trusted apps or applets 155 to use the private key of the public/private key pair 145 stored in secure memory 135 and/or the digital certificate(s) 150 for external network service access 160 and/or for performing PKI functions 165, as described further below. The PKI functions 165 performed by trusted app(s) or applet(s) 155 may include authentication, encryption, signature generation, key management, data shredding, or data zipping functions. In some implementations, public/private key pair 145 stored in secure memory 135 may include multiple public/private key pairs, with each public/private key pair being associated with multiple different identities or accounts of the device user (e.g., personal account/identity, business account/identity, etc.).

Figure 1B:
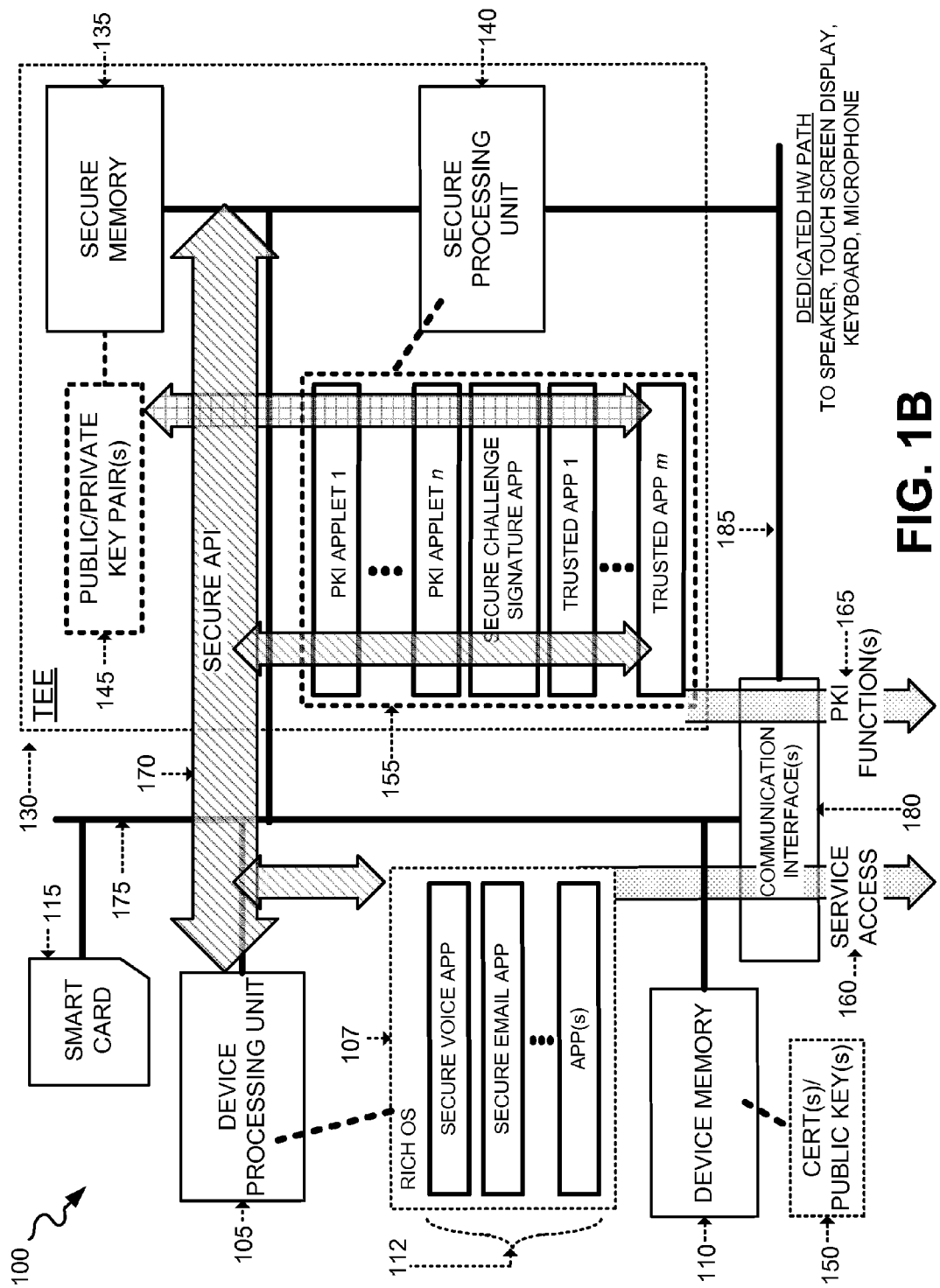

In some implementations, rich OS 107 may have, as shown in FIGS. 1A and 1B, restricted access, via, for example, a secure API 170, to data stored in secure memory 135 and to functions executed by secure processing unit 140. These implementations may include TEE 130 implemented in an isolated hardware environment, or TEE 130 implemented in software (e.g., firmware). If rich OS 107 needs to perform a PKI transaction, rich OS 107 passes the parameters of that transaction through secure API 170 to a trusted application or PKI applet 155 in TEE 130 that has access to the private key of the public/private key pair 145. The trusted application or PKI applet 155 performs the PKI transaction using the private key stored in secure memory 135 and passes the result(s) of the PKI transaction back to rich OS 107. Trusted applications/PKI applets 155 executed within TEE 130 may, in addition to data stored on secure memory 135, use data stored on smart card 115 (e.g., UICC or embedded Secure Element) and/or device memory 110.

FIG. 1B depicts further details of the isolated hardware or software-based environment of device 100 of FIG. 1A. As shown in FIG. 1B, a bus 175 may interconnect smart card 115, device processing unit 105, device memory 110, a communication interface(s) 180, secure memory 135, and secure processing unit 140. Bus 175 may include one or more paths that enable the components of device 100 to communicate with one another, with only a secure API 170 being usable to access secure memory 135 and/or secure processing unit 140 via bus 175. Communication interface(s) 180 includes one or more wired or wireless interfaces for communicating via a link or via a network (e.g., network 230 in FIG. 2). Communication interface(s) 180 may include, for example, a radio frequency (RF) transceiver, a BlueTooth transceiver, a Near Field Communication (NFC) transceiver, a Universal Serial Bus (USB), and/or a Wi-Fi transceiver. In some implementations, communication interface(s) 180 may also include a Radio Frequency Identification (RFID) reader for scanning RFID tags. In the implementation of FIG. 1B, the secure memory 135 and secure processing unit 140 may be implemented on a System on a Chip (SOC) that is secure from device processing unit 105 and device memory 110 (i.e., secure from rich OS 107). In the implementation of FIG. 1B, secure memory 135 and secure processing unit 140 are only addressable within TEE 130, and are not addressable by device processing unit 105. Secure API calls from device processing unit 105 to TEE 130 are the only mechanism by which device processing unit 105 may access the results of processing within TEE 130. Multiple different apps 112 may be executed by rich OS 107, where the apps 112 may request the performance of secure PKI functions in TEE 130 via secure API 170. Apps 112 may include, for example, a secure voice app that uses secure PKI functions performed by TEE 130 to initiate and engage in secure voice sessions with another device or system. Apps 112 may also include, for example, a secure email app that uses secure PKI functions performed by TEE 130 to send and receive encrypted emails. Apps 112 may include additional apps, not specifically described herein.

As further shown in FIG. 1B, secure processing unit 140 may have a dedicated hardware path 185 to communication interface 180, and to other components of device 100 that are not shown in FIGS. 1A and 1B, such as device 100's input and output device(s) (e.g., speaker(s), touch screen display(s), keyboard, and/or microphone(s)). Dedicated hardware path 185 as shown in FIG. 1B is independent of, and unconnected to, bus 175, device processing unit 105 or device memory 110. FIG. 1B further depicts trusted apps/applets 155 that may be executed by secure processing unit 140 in TEE 130, including PKI applets 1-n, and trusted apps 1-m. Trusted apps 1-m and/or PKI applets 1-n may include authentication, encryption, signature generating, key management (mgt), shred and/or zip applications. PKI transactions, using PKI applets in TEE 130, may, in some implementations, be performed using one or more of communications interfaces 180. The PKI applet(s) may use a public key/digital certificate and/or a private key to perform one or more different PKI transactions, and to provide the results of the PKI transactions to apps 112 executing in rich OS 107.

Figure 1C:
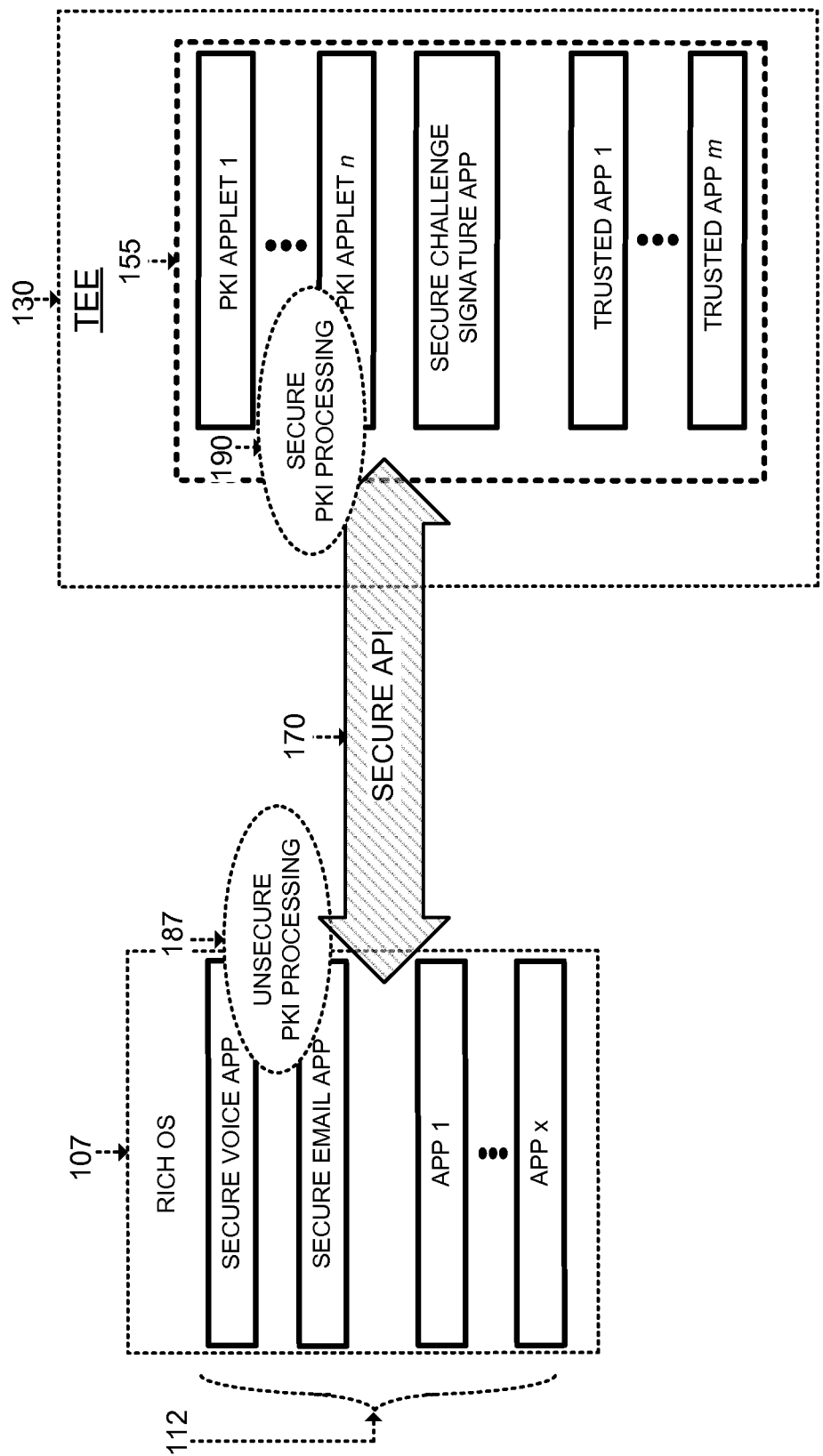

FIG. 1C depicts additional details of apps in rich OS 107 using PKI applets in TEE 130 to perform secure PKI functions within TEE 130. As shown, apps 112, including a secure voice app, secure email app, and/or other apps 1-x, may perform an unsecure portion of PKI processing 187 and may request the performance of a secure portion of PKI processing from trusted apps/applets 155 of TEE 130 via secure API 170. Secure API 170 may enable rich OS 107 to interact with TEE 130, using secure TEE mechanisms, such that trusted apps/applets 155 may perform the requested functions (e.g., PKI functions) and return results of those functions to apps 112 in rich OS 107. For example, the secure email app, executing in Rich OS 107, may, when sending email messages, use secure API 170 to pass a message to be encrypted to TEE 130. A PKI applet in TEE 130 retrieves the private key from secure memory 135 and encrypts the message before returning the encrypted message via secure API 170 to the secure email app. Apps 112 in rich OS 107, thus, perform the unsecure PKI processing 187 associated with a PKI transaction, and a PKI applet within TEE 130 performs secure PKI processing 190 using a public or private key, to generate results that can be passed back to the apps 112 for completion of the particular PKI transaction or operation being performed within rich OS 107. FIG. 1C depicts secure PKI processing being requested from TEE 130 by an app 112 in rich OS 107.

Figure 2:
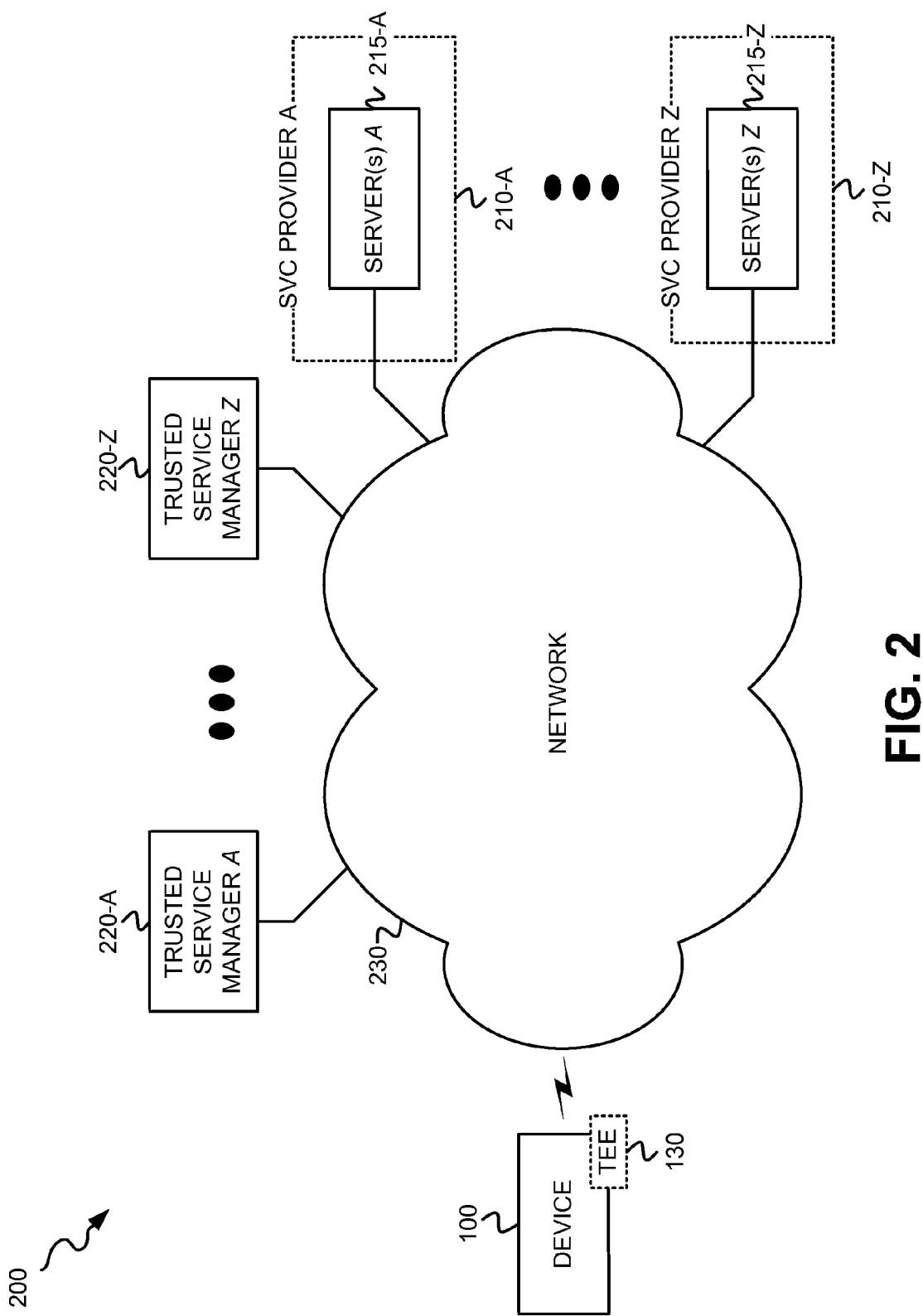
FIG. 2 is a diagram of an exemplary network environment in which the device of FIGS. 1A and 1B, implementing the isolated and secure data storage and processing environment, may be deployed.

FIG. 2 is a diagram of an exemplary network environment 200 in which device 100, implementing a TEE 130, may be deployed. Network Environment 200 may include service providers 210-A through 210-Z, trusted service managers 220-A through 220-Z, and network 230.

Service providers 210-A through 210-Z (generically and individually referred to herein as a "service provider 210" and collectively as "service providers 210") may each include a respective server(s) 215-A through 215-Z (generically and individually referred to herein as a "server(s) 215" and collectively as "servers 215") which further includes one or more network devices. Server(s) 215 of service provider 210 delivers a network service(s) to device 100. Trusted service managers 220-A through 220-Z (generically and individually referred to herein as a "service manager 220" and collectively as "service managers 220") may each manage secure access to a network service provided by a respective server 215 of a service provider 210. Trusted service manager 220 may, for example, issue a service digital certificate for one or more network services to device 100, and grant secure access to the one or more network services based on a subsequent service request from device 100. Trusted service managers 220-A through 220-Z may manage the network service access as described further with respect to FIGS. 9 and 10 below. Multiple ones of trusted service managers 220-A through 220-Z may be implemented as a single trusted service manager.

Network 230 may include one or more networks of any type, such as, for example, a telecommunications network (e.g., a Public Switched Telephone Network (PSTN) or Public Land Mobile Network (PLMN)), a local area network (LAN), a wide area network (WAN), a metropolitan area network (MAN), an intranet, the Internet, a wireless satellite network, a cable network (e.g., an optical cable network), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN and/or other types of PLMNs not specifically described herein.

The configuration of network environment 200 depicted in FIG. 2 is for illustrative purposes only. It should be understood that other configurations may be implemented. Therefore, network environment 200 may include additional, fewer and/or different components than those depicted in FIG. 2. For example, though only a single device 100 with a TEE 130 is shown in FIG. 2, multiple devices 100 may connect to network 230, each having its own TEE 130. In other implementations, device 100 may include multiple Trusted Execution Environments, each independent of one another.

Figure 3:
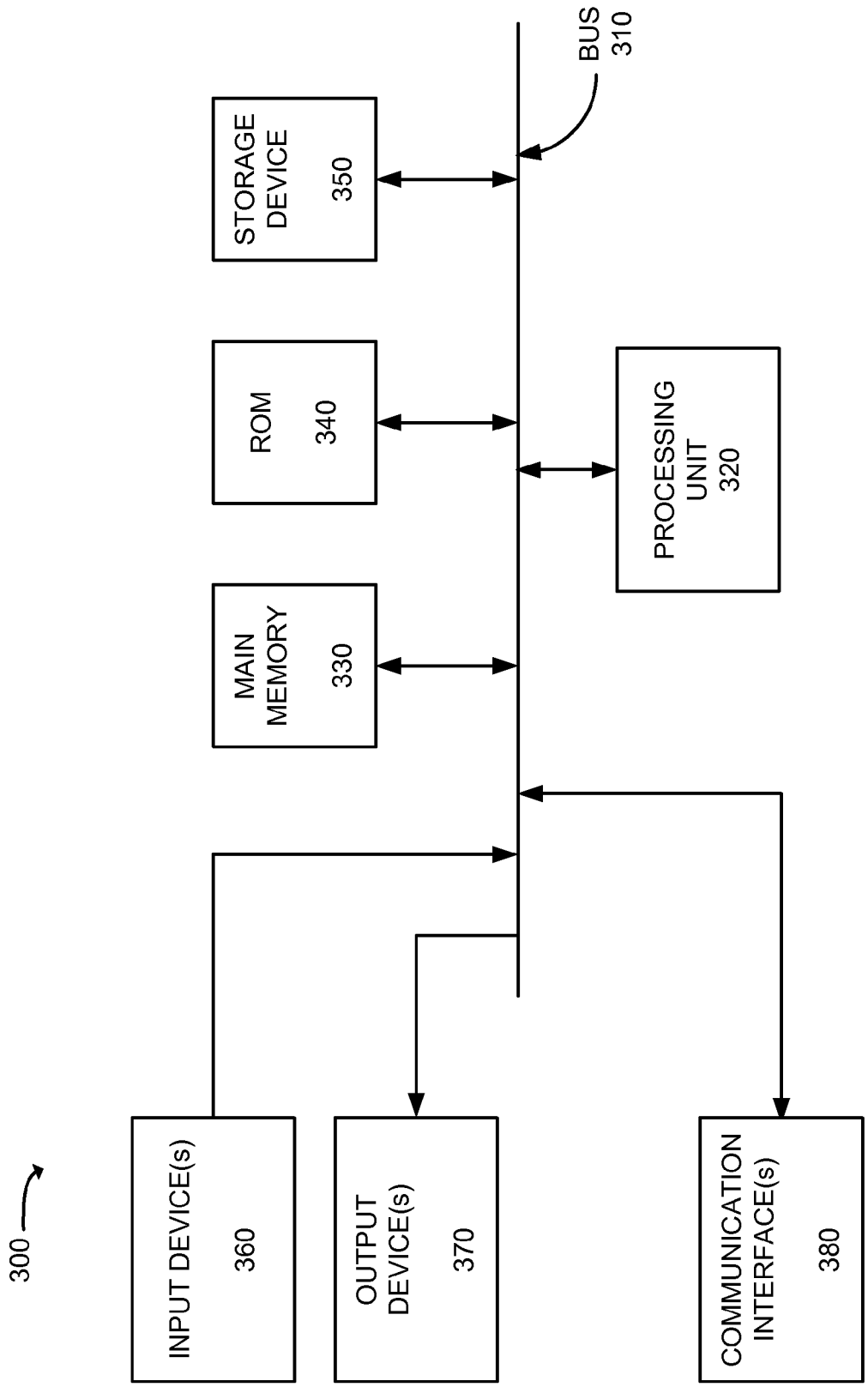
FIG. 3 is a diagram of exemplary components of a device that may correspond to each of the trusted manager, servers, and service managers of FIG. 2.

FIG. 3 is a diagram of exemplary components of a device 300. Device 100, trusted service manager 220, and server 215 may each be configured identically to, or similar to, device 300 of FIG. 3. Device 300 may include a bus 310, a processing unit 320, a main memory 330, a read only memory (ROM) 340, a storage device 350, an input device(s) 360, an output device(s) 370, and a communication interface 380. Bus 310 may include a path that permits communication among the elements of device 300.

Processing unit 320 may include a processor, microprocessor, or processing logic that may interpret and execute instructions. Main memory 330 may include a random access memory (RAM) or another type of dynamic storage device that may store information and instructions for execution by processing unit 320. ROM 340 may include a ROM device or another type of static storage device that may store static information and instructions for use by processing unit 320. Storage device 350 may include a magnetic and/or optical recording medium and its corresponding drive.

Input device(s) 360 may include one or more mechanisms that permit an operator to input information to device 300, such as, for example, a keypad or a keyboard, voice recognition and/or biometric mechanisms, etc. Output device(s) 370 may include one or more mechanisms that output information to the operator, including a display, a speaker, etc. Communication interface 380 may include any transceiver mechanism that enables device 300 to communicate with other devices and/or systems. For example, communication interface 380 may include mechanisms for communicating with another device or system via a network, such as network 230.

Device 300 may perform certain operations or processes, as may be described below. Device 300 may perform these operations in response to processing unit 320 executing software instructions contained in a computer-readable medium, such as memory 330. A computer-readable medium may be defined as a physical or logical memory device. A logical memory device may include memory space within a single physical memory device or spread across multiple physical memory devices.

The software instructions may be read into main memory 330 from another computer-readable medium, such as storage device 350, or from another device via communication interface 380. The software instructions contained in main memory 330 may cause processing unit 320 to perform operations or processes that will be described later. Alternatively, hardwired circuitry may be used in place of or in combination with software instructions to implement processes consistent with the principles of the invention. Thus, exemplary implementations are not limited to any specific combination of hardware circuitry and software.

The configuration of components of device 300 illustrated in FIG. 3 is for illustrative purposes only. It should be understood that other configurations may be implemented. Therefore, device 300 may include additional, fewer and/or different components, and/or differently arranged components, than those depicted in FIG. 3.

Figure 4:
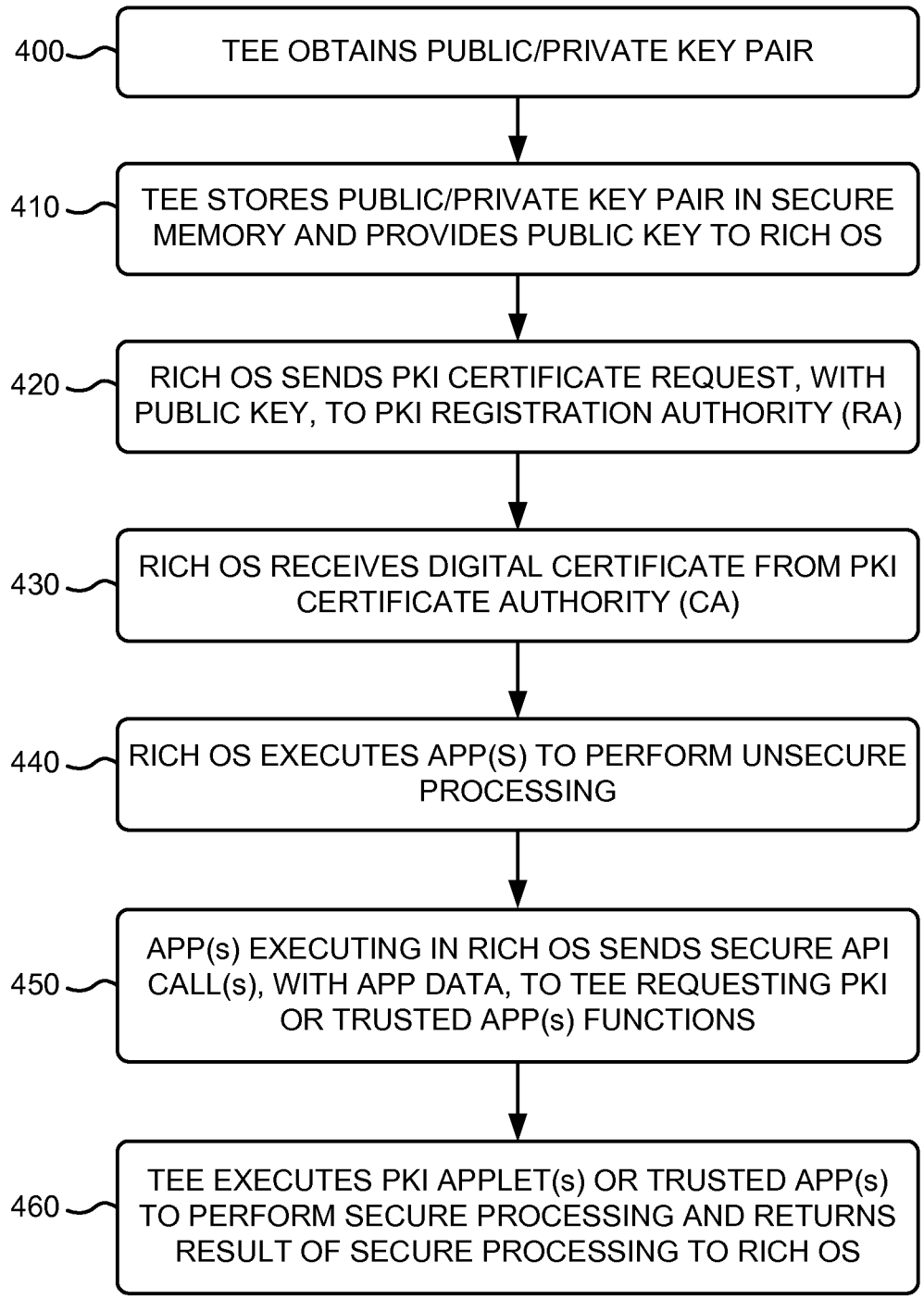
FIG. 4 is a flow diagram of an exemplary process for storing keys in a Trusted Execution Environment of the device of FIG. 1A, and for executing trusted apps in the Trusted Execution Environment to perform secure functions using the keys.

FIG. 4 is a flow diagram of an exemplary process for storing keys in TEE 130, and for executing trusted apps in TEE 130 to perform secure functions using the stored keys. The exemplary process of FIG. 4 may be implemented by device 100. The exemplary process of FIG. 4 is described with reference to the exemplary messaging diagram of FIG. 5.

Figure 5:
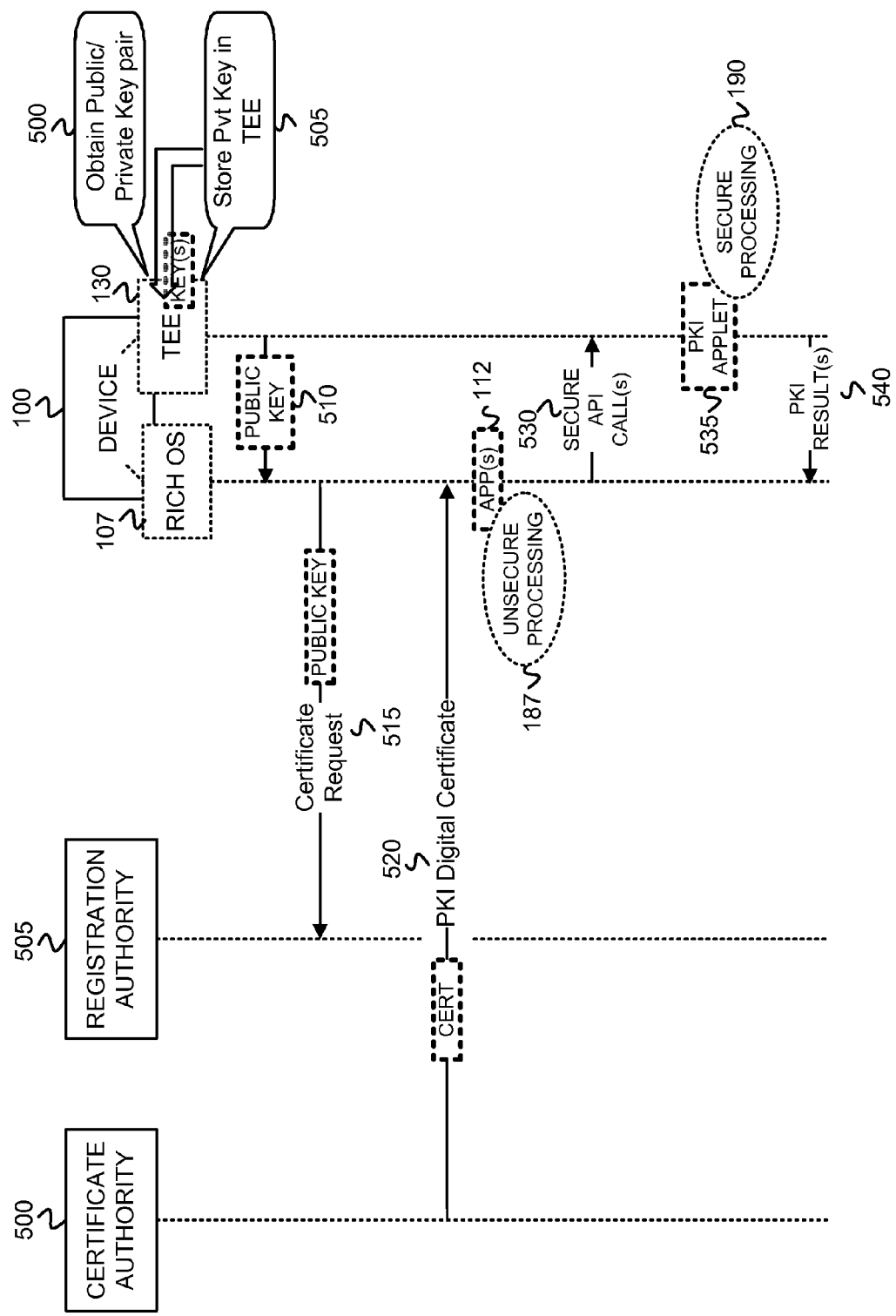
FIG. 5 is a diagram of exemplary messaging associated with the process of FIG. 4.

The exemplary process may include TEE 130 of device 100 obtaining a public and private key pair (block 400). TEE 130 may, for example, execute a trusted app or PKI applet 155 that performs a key generation algorithm that generates the public and private key pair. One of various different public key algorithms may be used, such as, for example, the Rivest-Shamir-Adleman (RSA) public key algorithm. FIG. 5 depicts TEE 130 obtaining 500 a public and private key pair. TEE 130 stores the public/private key pair in secure memory 135 and provides the public key to rich OS 107 (block 410). FIG. 5 depicts the private key being stored 505 in TEE 130 of device 100, and the public key 510 being passed to rich OS 107 for use by apps 112. Rich OS 107 sends a Public Key Infrastructure (PKI) request, with the public key received in block 410, to a PKI Registration Authority (RA) (block 420). In accordance with existing PKI processes, the RA verifies the identity of the user associated with the PKI request and the public key, stores the public key, and sends a message to the PKI Certificate Authority (CA) authorizing the CA to generate and issue a digital certificate to device 100. FIG. 5 depicts rich OS 107 of device 100 sending a certificate request 515, which includes the public key and user identification information (not shown), to Registration Authority 505. Rich OS 107 receives a digital certificate from the PKI Certificate Authority (CA) (block 430). Upon receipt of authorization from Registration authority 505 (not depicted in FIG. 5), certificate authority 500 returns, as shown in FIG. 5, a PKI digital certificate 520 to rich OS 107 of device 100.

Rich OS 107 executes an app(s) to perform unsecure processing associated with one or more transactions or operations (block 440). The app 112 being executed in rich OS 107 may include, for example, a secure email app, a secure voice app, or other of apps 112. FIG. 5 illustrates an app 112 in rich OS 107 executing to perform unsecure processing 187. When the app(s) executing in rich OS 107 requires secure processing results, the app(s) sends a secure API call(s), with application data, to TEE 130 requesting PKI or trusted app(s) functions (block 450). For example, if a secure email app is executing in rich OS 107, the secure email app may send a message to be encrypted to TEE 130 via a secure API call(s). FIG. 5 depicts app 112 issuing a secure API call(s) 530 to PKI applet 535, with the secure API call(s) including the data (not shown) to be processed by TEE 130. Upon receipt of the secure API call(s), TEE 130 executes a PKI applet(s) or trusted app(s) to perform secure processing, and returns the result of the secure processing to rich OS via the secure API (block 460). The secure API call(s) from rich OS 107 identifies the particular one of the PKI applets or trusted apps in TEE 130 to be executed to perform the secure processing. FIG. 5 illustrates PKI applet 535 performing secure processing 190 to generate PKI results, and returns the PKI results 540 to app 112 in rich OS 107.

Figure 6A:
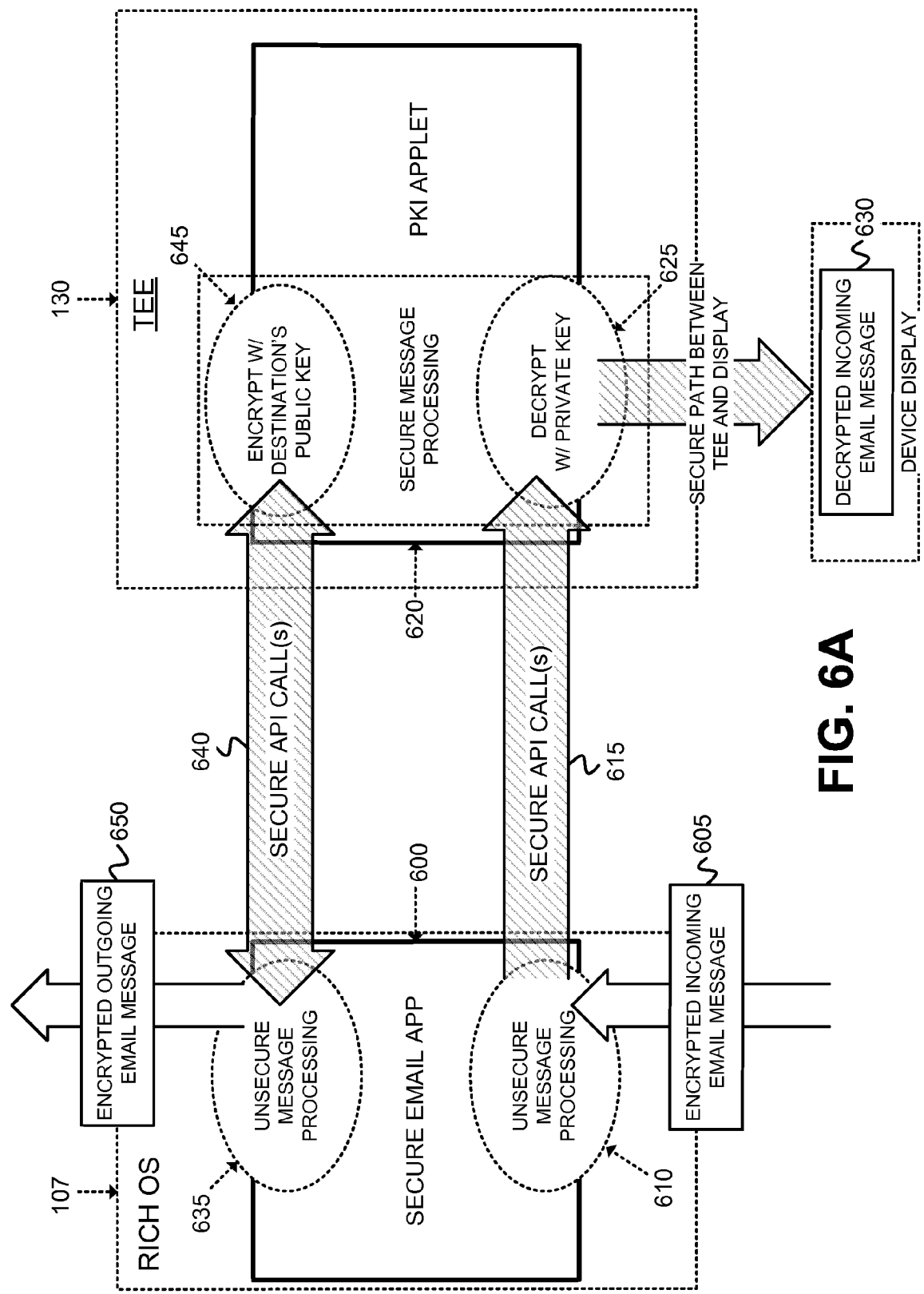
FIGS. 6A, 6B and 7 are diagrams depicting examples of trusted app execution within the Trusted Execution Environment during the exemplary process of FIG. 4.

FIG. 6A depicts an example where a secure email app 600, executed by rich OS 107, uses TEE 130 to perform secure encryption and decryption of email messages. As shown in FIG. 6, an encrypted incoming email message 605 is received at secure email app 600 in rich OS 107. Upon receipt of encrypted message 605, secure email app performs initial unsecure processing 610 of the encrypted message 605 before issuing a secure API call 615 to a PKI applet 620 in TEE 130. Secure API call 615 includes the message to be decrypted. Upon receipt of the secure API call 615 and the message to be decrypted, PKI applet 620 in TEE 130 performs secure message processing, where the secure message processing includes decrypting 625 the email message using the private key stored in TEE 130. Upon completion of decryption of the email message, PKI applet 620 sends the decrypted message 630 via a secure path to a display (e.g., touch screen display) of device 100, where the device user may access and read the decrypted email message. For example, referring to FIG. 1B, the secure path may include the dedicated hardware path 185 between secure processing unit 140 of TEE 130 and the display of device 100. TEE 130 may not return decrypted email message 630 to rich OS 107, and all interactions with decrypted email message 630 may only occur within TEE 130.

As also shown in FIG. 6A, secure email app 600 may have an outgoing email message that requires encryption. Secure email app 600, based on user input, may generate the outgoing email message using unsecure message processing 635, and may issue a secure API call(s) 640 to PKI applet 620 in TEE 130. Secure API call(s) 640 may include the email message to be encrypted. Upon receipt of secure API call(s) 640, PKI applet 620 may perform secure message processing that includes encrypting 645 the outgoing message with the message destination's public key stored in TEE 130. Upon completion of the encryption of the message, PKI applet 620 returns the encrypted message to secure email app 600 in rich OS 107. Upon receipt by secure email app 600, the encrypted message 650 can be processed 635 for outgoing transmission via, for example, communication interface(s) 180 of device 100.

Figure 6B:
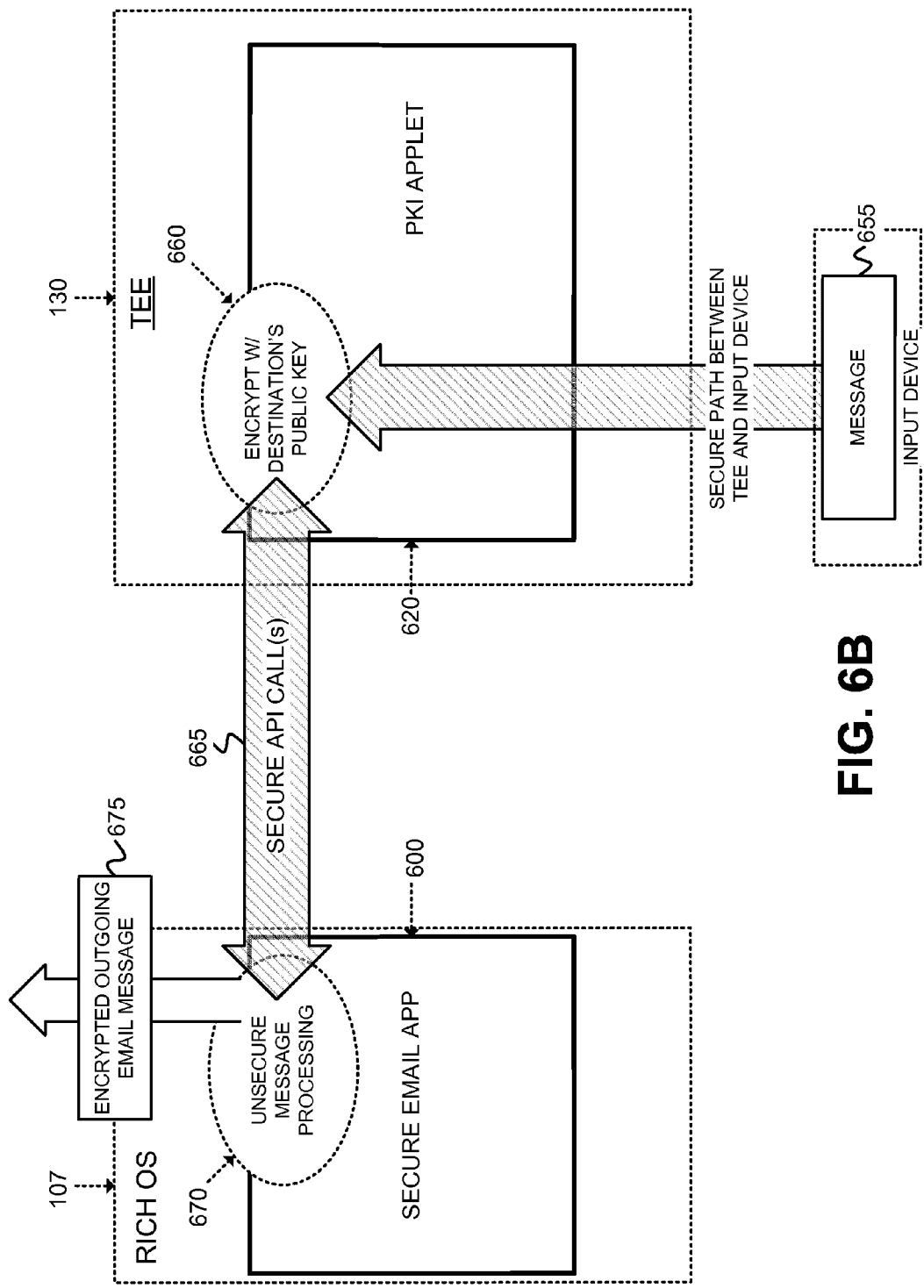

FIG. 6B depicts an additional implementation of TEE 130 encryption of an outgoing email message. In this implementation, the user of device 100 enters a message 655 via input device(s) 360 (e.g., a touch screen, keypad, or keyboard) and also via a secure path between input device(s) 360 and TEE 130. For example, the secure path between input device(s) 360 and TEE 130 may include dedicated hardware path 185 shown in FIG. 1B as being connected between the input device(s) (e.g., touch screen display or keyboard) and secure processing unit 140 of TEE 130. Therefore, in the implementation of FIG. 6B, message 655 in an unencrypted form is only interacted with, and processed, within TEE 130, and rich OS 107 never interacts with message 655 in unencrypted form. Upon receipt of message 655, PKI applet 620 may perform secure message processing that includes encrypting 660 the outgoing message with the message destination's public key stored in TEE 130. Upon completion of the encryption 660 of the message, PKI applet 620 sends, via a secure API call(s) 665, the encrypted message to secure email app 600 in rich OS 107. Upon receipt by secure email app 600, the encrypted message 675 can be processed 670 for outgoing transmission via, for example, communication interface(s) 180 of device 100.

Figure 7:
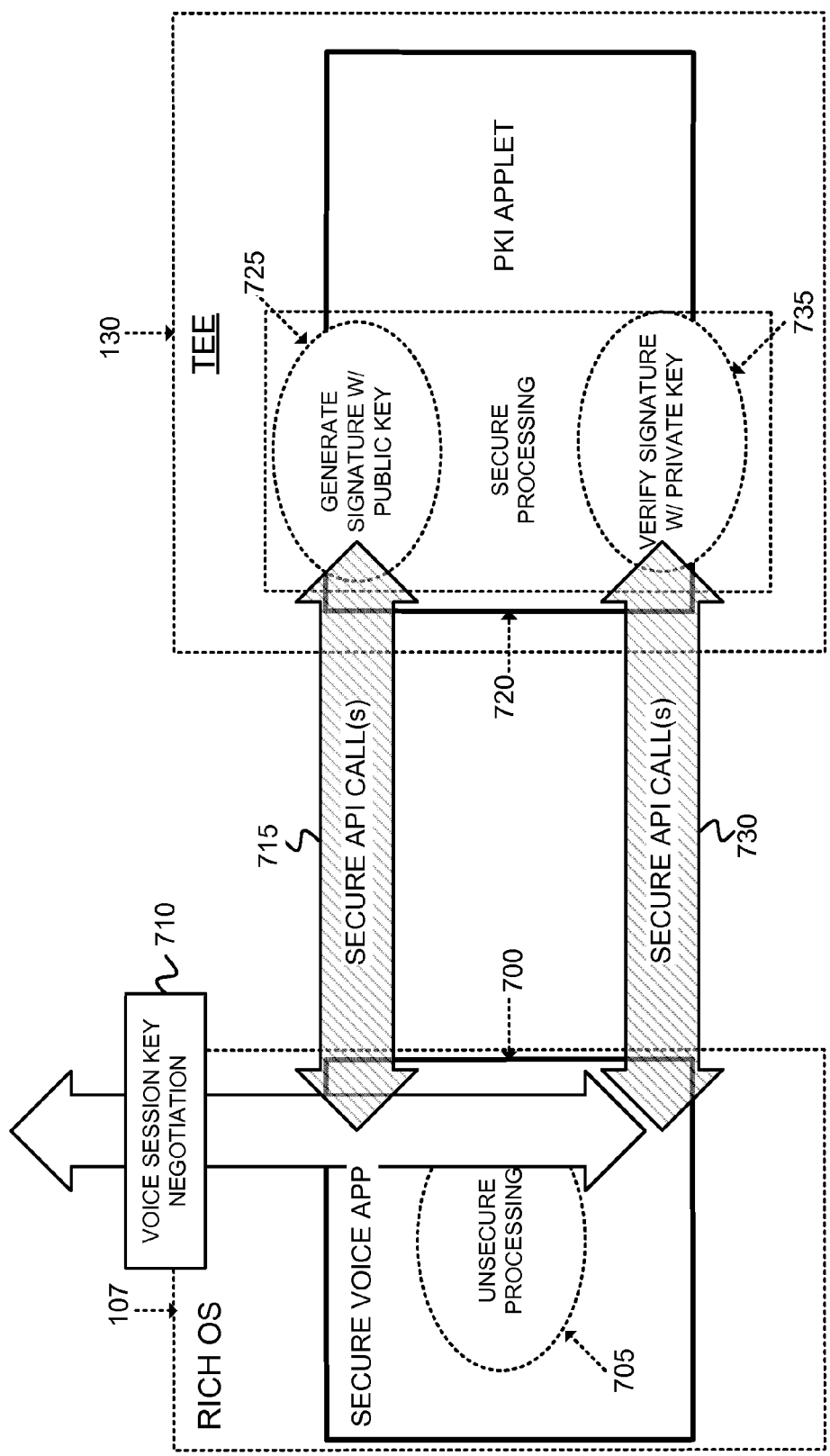

FIG. 7 depicts a secure voice app 700 interacting with TEE 130 for the purpose of signature generation and signature verification during secure voice sessions between device 100 and another device. Secure voice app 700 may engage in unsecure processing 705 during voice session key negotiation 710 with another device with which device 100 is going to communicate via a secure voice session. As part of the voice session key negotiation 710, the public key of the destination device, stored in TEE 130, may be used to sign session key negotiations. During such negotiations, secure voice app 700 may send a secure API call(s) 715 to PKI applet 720 of TEE 130 to request signature generation. Upon receipt of secure API call(s) 715, PKI applet 720 generates a signature for the session key negotiation with the other device using the public key (previously obtained by device 100) of the other device stored in TEE 130. PKI applet 720 returns the generated signature to secure voice app 700 for use by secure voice app 700 during voice session key negotiation 710. During voice session key negotiation 710, secure voice app 700 may receive a signature from the other device, and may pass the signature to PKI applet 720 via a secure API call(s) 730. Upon receipt of secure API call(s) 730, PKI applet 720 may retrieve the private key from secure memory 135 and perform a signature verification technique 735, using the private key, to verify the received signature from the other device. If the signature is verified, secure voice app 700 can complete the voice session key negotiation process 710 such that a session key can be selected or shared by one or both of device 100 and the other device.

The entirety of the exemplary process of FIG. 4, or one or more specific blocks of FIG. 4, may be selectively repeated. For example, TEE 130 may obtain and store a new public/private key pair by repeating blocks 400-430. As another example, TEE 130 may obtain and store a new digital certificate by repeating blocks 420-430. Blocks 400 and 410 may be performed whenever a private key is generated and stored in TEE 130.

Figure 8:
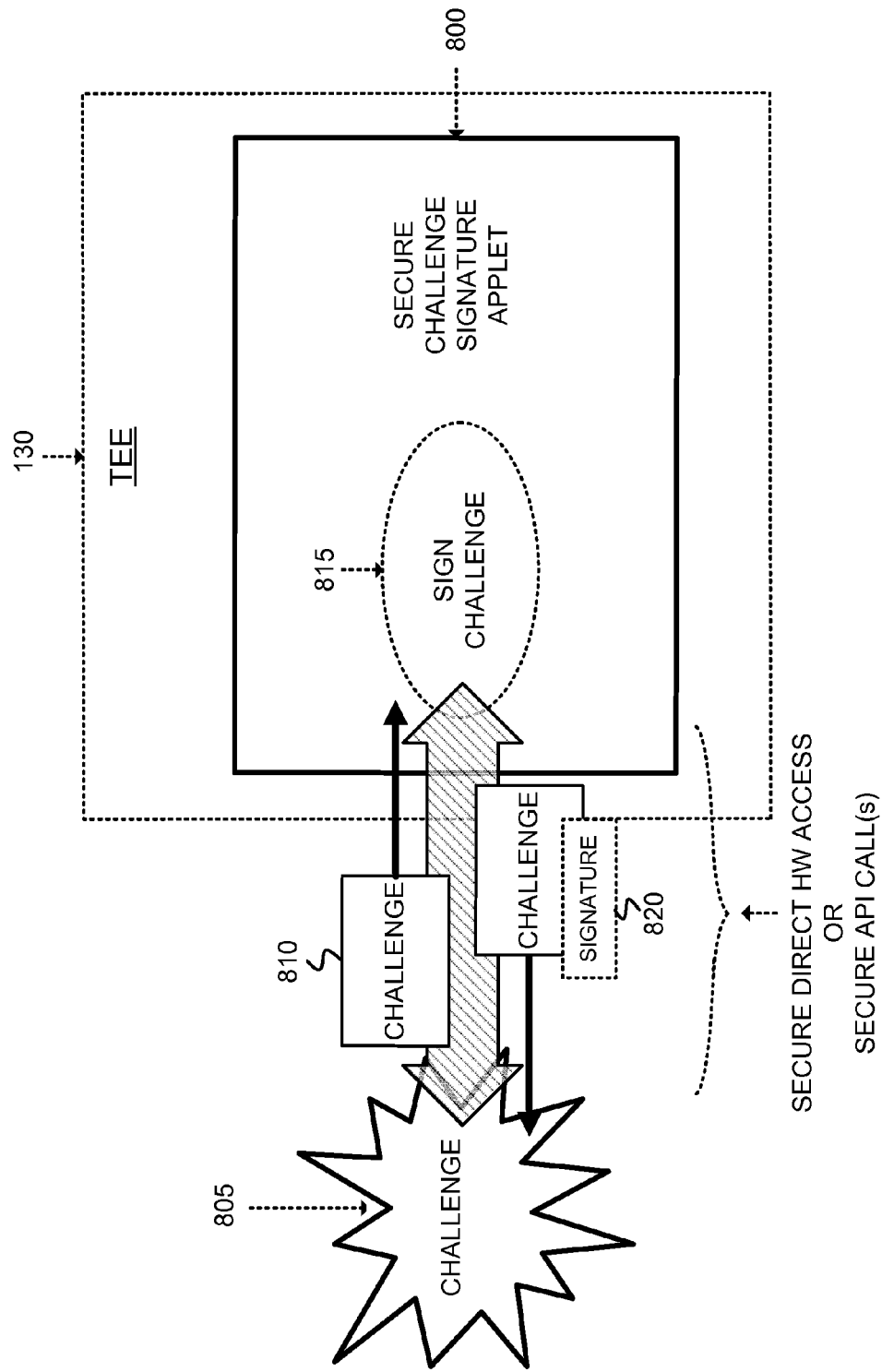
FIG. 8 is a diagram that depicts an exemplary embodiment in which a secure signature applet within the Trusted Execution Environment is used to respond to, and sign, a challenge that challenges the authenticity of the user of the device of FIG. 1A.

FIG. 8 depicts an exemplary embodiment in which a secure signature applet 800 within TEE 130 is used to respond to, and sign, a challenge that challenges the authenticity of the user of device 100. With device 100 placed into an access mode, the challenge 805 may be received at device 100 in various different ways, including via USB, RFID, NFC, network 230, a keyboard of device 100, or a touch screen of device 100. Secure signature applet 800 may receive challenge 805 via secure direct hardware (HW) access (e.g., via communication interface(s) 180 and bus 185) or via a secure API call(s) into TEE 130. In the embodiment of FIG. 8, the challenge 805 and the responding challenge signature may be processed by secure signature applet 800 in TEE 130 without processing by, or interaction with, rich OS 107. Challenge 805, which may originate via USB, RFID, NFC, network 230, keyboard of device 100, or a touch screen of device 100, may be passed to TEE 130 as a challenge message 810. Upon receipt at signature applet 800 in TEE 130, applet 800 may use a previously stored public key, and user credential information, to generate a signature 820 for signing 815 the challenge message 810. The user credential information may include any kind of data that can be used to authenticate the user of device 100, such as, for example, a hash of a user password, user biometric data, etc. Secure signature applet may use the credential information and the public key, and a signature generation algorithm, to generate signature 820. Subsequent to generation of signature 820, signature applet 800 may issue the signed challenge message. The receiving device may use its own private key to extract the credential information from the signed challenge message, and may verify the authenticity of the user based on the credential information.

Figure 9:
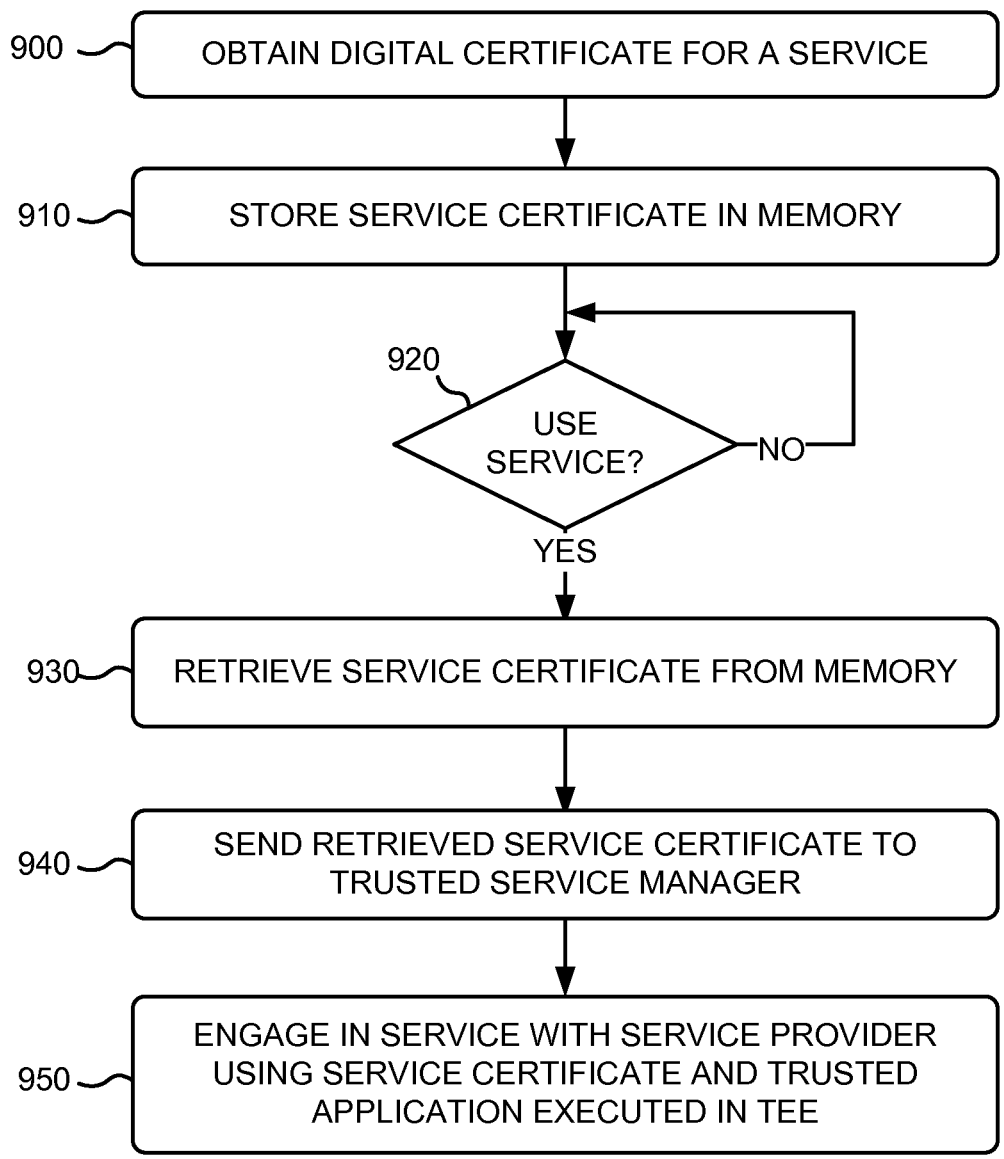
FIG. 9 is a flow diagram illustrating an exemplary process for engaging in a network service offered by a network service provider using a service certificate and via one or more trusted apps executing in the Trusted Execution Environment of FIG. 1A.
Figure 10:
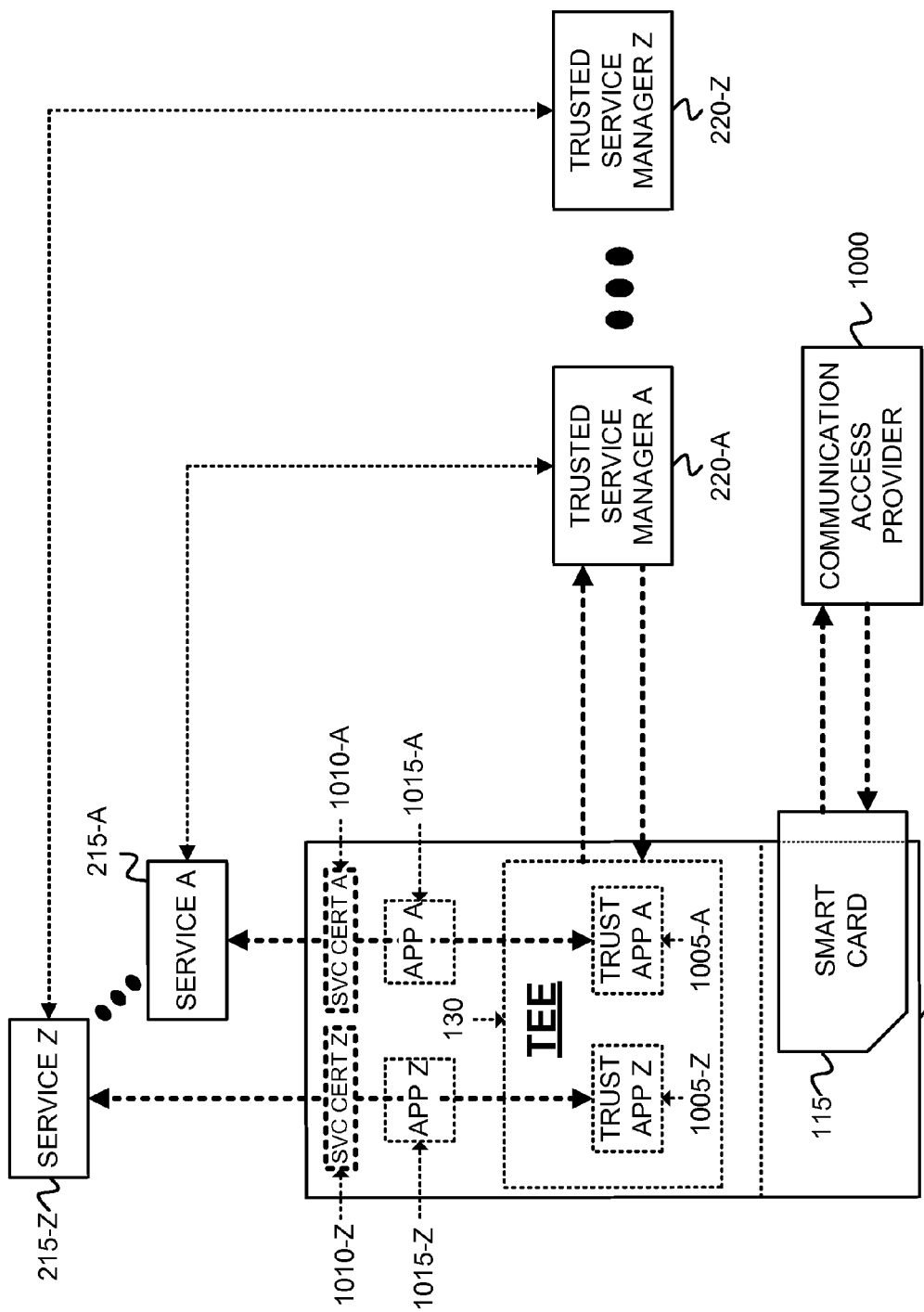
FIG. 10 is a diagram of exemplary messaging associated with the process of FIG. 9.

FIG. 9 is a flow diagram illustrating an exemplary process for engaging in a network service offered by a network service provider using a service certificate and via one or more trusted apps 155 executed by TEE 130. The exemplary process of FIG. 9 may be implemented by device 100. The exemplary process of FIG. 9 is described with reference to the exemplary messaging diagram of FIG. 10. In addition to depicting messaging associated with the process of FIG. 9, FIG. 10 shows smart card 115 communicating with a communication access provider 1000, such as a provider that provides access to network 230.

The exemplary process may include TEE 130 obtaining a digital certificate for a network service (block 900). Referring to FIG. 10, trusted service manager 220 may unilaterally "push" a digital certificate (dotted line from trusted service manager 220-A to device 100) for a given network service to device 100, or device 100 may "pull" the digital certificate from trusted service manager 220 (first, the dotted line from device 100 to trusted manager 220-A, and thereafter the dotted line from trusted service manager 220-A to device 100). Trusted service manager 220 "pushes" a digital certificate for a given service (referred to herein as "service certificate") by obtaining the service certificate, constructing a message that includes the service certificate, and sending the message to device 100 via network 230 (not shown in FIG. 10). Device 100 "pulls" the service certificate from trusted service manager 220 by sending a request to trusted service manager 220 that identifies the network service being requested and includes device 100's PKI digital certificate. In response to receiving the request from device 100, trusted service manager 220 obtains the service certificate, and sends the requested service certificate to device 100 via network 230.

TEE 130 stores the service certificate in memory (block 910). TEE 130 may store the service certificate in secure memory 135, or pass the service certificate to rich OS 107 for storing in device memory 110. For example, as shown in FIG. 10, TEE 130 stores service certificates 710-A through 710-Z, for network services 215-A through 215-Z. TEE 130 determines if a network service is to be used (block 620). If the service certificate was unilaterally "pushed" from trusted service manager 220 to device 100, a user of device 100 may have to acknowledge acceptance of the network service to activate it. If the service certificate was "pulled" from trusted service manager 220 by device 100, the user of device 100 may request the initiation of the network service.

TEE 130 retrieves the appropriate service certificate from memory (block 930) and sends the retrieved service certificate to a trusted service manager 220 (block 940). Upon acknowledging acceptance of the network service, or requesting the initiation of the network service, by the user of device 100, TEE 130 retrieves a corresponding service certificate from memory (e.g., secure memory 135, FIG. 1A) and sends the service certificate to trusted service manager 220 via communication interface 180 and network 230. Upon receipt of the service certificate, trusted service manager 220 verifies the service certificate and, upon successful verification, authorizes the network service for device 100 via a corresponding server 215. To authorize a requested network service, trusted service manager 220 sends a service granting message to the corresponding server 215 for the requested network service.

TEE 130 engages in a network service with a service provider, using the service certificate and a trusted application executed in TEE 130 (block 950). Referring again to FIG. 10, TEE 130 executes a trusted application (e.g., trust app Z 1005-Z) and engages in the network service (e.g., service Z implemented by server 215-Z) using the service certificate (e.g., svc cert Z 1010-Z). Engaging in the network service via the trusted app may, as depicted in FIG. 10, additionally involve interaction with an application (e.g., app Z) executed by device processing unit 105 (not shown in this FIG.; see FIG. 1A) within rich OS 107 (not shown in this FIGURE; see FIG. 1A) and outside of TEE 130. FIG. 10 shows TEE 130 executing trusted app Z 1005-Z and using service certificate Z 1010-Z to engage in a network service Z with server 215-Z via application Z 1015-Z that is "outside" of TEE 130. FIG. 10 further shows TEE 130 executing trusted app A 1005-A and using service certificate A 1010-A to engage in a network service A with server 215-A via application A 1010-A that is "outside" of TEE 130 (i.e., executed by rich OS 107). Each network service may include any type of network service provided over network 230 such as, for example, a streaming media delivery network service.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 4 and 9, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
executing, at a device, a first application that performs unsecure processing of first data;
using one or more first secure Application Programming Interface (API) calls to request secure processing of at least a portion of the first data by a second application within a Trusted Execution Environment (TEE) of the device, wherein the one or more first secure API calls include sending the at least a portion of the first data to the TEE;
obtaining, at the device, a first public encryption key and a first private encryption key of a first public/private key pair associated with the device;
obtaining a second public encryption key, of a second public/private encryption key pair, associated with a destination device that is different than the device;
storing, at the device, the first public encryption key, the first private encryption key, and the second public encryption key in a secure memory of the TEE;
executing the second application, as a secure, trusted application within the TEE, to perform the secure processing of the at least a portion of the first data using the stored second public encryption key or the first private encryption key,
wherein the first application comprises an email application, wherein the second application comprises a Public Key Infrastructure (PKI) applet within the TEE, wherein the at least a portion of the first data comprises an unencrypted email message or an encrypted email message, and wherein the secure processing comprises:
decrypting, by the PKI applet within the TEE, the encrypted email message using the first private encryption key stored in the TEE, or
encrypting, by the PKI applet within the TEE, the unencrypted email message using the second public encryption key stored in the TEE; and
sending, from the TEE, the decrypted email message to a display of the device via a secure, dedicated hardware path, wherein a rich operating system (OS) of the device does not interact with the decrypted email message.

2. The method of claim 1, wherein the device includes a first device processing unit, that executes the first application, and wherein the TEE includes a second processing unit which executes processes, including the second application, that are secure from processes executed by the first device processing unit and wherein the device includes a first device memory and wherein the TEE comprises the secure memory that is secure from the first device memory.

3. A device, comprising:
one or more communication interfaces configured to communicate via at least one link or a network;
a device memory; and
a device processing unit configured to:
execute a first application that performs unsecure processing of first data, and
send, via one or more first secure Application Programming Interface (API) calls to a Trusted Execution Environment (TEE) in the device, a request that requests secure processing of at least a portion of the first data by a second application within the TEE, wherein the request includes the at least a portion of the first data;

wherein the TEE is secure from the device processing unit and the device memory and is configured to:
obtain a first public encryption key and a first private encryption key of a first public/private key pair associated with the device,
obtain a second public encryption key, of a second public/private encryption key pair, associated with a destination device that is different than the device,
store the first public encryption key, the first private encryption key, and the second public encryption key in a secure memory of the TEE,
execute the second application, as a secure, trusted application within the TEE, to perform the secure processing of the at least a portion of the first data using the second public encryption key,
wherein the first application comprises a voice application, wherein the second application comprises a Public Key Infrastructure (PKI) applet within the TEE, wherein the at least a portion of the first data comprises a request for generating a first signature associated with session key negotiation between the device and the destination device for a secure voice session, and wherein the secure processing comprises the PKI applet generating the first signature for the session key negotiation using the second public encryption key stored in the secure memory of the TEE,
obtain a voice session key based on the session key negotiation,
decrypt voice data, associated with the secure voice session between the device and the destination device, within the TEE using the voice session key, and
send, from the TEE, the decrypted voice data to an output device of the device via a secure, dedicated hardware path, wherein a rich operating system (OS) of the device does not interact with the decrypted voice data.

4. The device of claim 3, wherein the TEE includes a second processing unit that is separate and secure from the device processing unit and wherein the TEE comprises the secure memory that is separate and secure from the device memory.

5. The device of claim 3, wherein the TEE is further configured to:
use one or more second secure API calls to return results of the secure processing to the first application, wherein the results comprise the first signature for the session key negotiation.

6. The method of claim 1, further comprising:
returning, from the TEE, the encrypted email message to the email application within the rich OS of the device.

7. The method of claim 1, wherein executing the first application further comprises:
generating, by the first application, the unencrypted email message as an outgoing email message.

8. The method of claim 7, wherein generating the unencrypted email message comprises:
receiving, by the TEE, content of the unencrypted email message via the secure, dedicated hardware path between an input device of the device and the TEE.

9. The method of claim 8, wherein the rich OS of the device does not interact with the unencrypted email message prior to the encrypting of the unencrypted email message.

10. The device of claim 3, wherein the TEE is further configured to:
return, via one or more second secure API calls, the generated signature to the voice application,
wherein the device processing unit, when executing the voice application, is further configured to:
send, via the one or more communication interfaces, the generated signature to the destination device.

11. The device of claim 3, wherein the device processing unit is further configured to:
execute the first application to perform unsecure processing of second data, and
send, via one or more second secure API calls to the TEE in the device, a second request that requests secure processing of at least a portion of the second data by the second application within the TEE, wherein the second request includes the at least a portion of the second data;
wherein the TEE is configured to:
execute the second application, as the secure, trusted application within the TEE, to perform the secure processing of the at least a portion of the second data using the first private encryption key,
wherein the at least a portion of the second data comprises a second signature generated at the destination device, wherein the second request requests verification of the received, second signature to complete the session key negotiation between the device and the destination device for the secure voice session, and wherein the secure processing comprises the PKI applet using the first private encryption key to verify the second signature received from the destination device.

12. The device of claim 11, wherein the device processing unit, when obtaining the voice session key, is further configured to:
select the voice session key for the secure voice session, and
cause the selected voice session key to be shared with the destination device for use during the secure voice session.

13. The device of claim 11, wherein the device processing unit, when obtaining the voice session key, is further configured to:
receive, via the one or more communication interfaces, the voice session key for the secure voice session selected and shared by the destination device.

* * * * *